United States Patent [19]

Brian

[11] Patent Number: 4,888,162

[45] Date of Patent: Dec. 19, 1989

[54] TEMPERATURE MODERATION WITH WATER OF AN OXYGEN ENRICHED CLAUS SULFUR PLANT

[75] Inventor: Barry W. Brian, Allentown, Pa.

[73] Assignee: Air Products and Chemicals, Inc., Allentown, Pa.

[21] Appl. No.: 627,379

[22] Filed: Jul. 3, 1984

[51] Int. Cl.⁴ .............................................. C01B 17/04
[52] U.S. Cl. ................................................ 423/574 R
[58] Field of Search ............... 423/574 R, 574 G, 576, 423/542; 422/160; 236/12.1, 12.14; 110/190; 431/4.5

[56] References Cited

U.S. PATENT DOCUMENTS

| | | | |
|---|---|---|---|
| 3,822,341 | 7/1974 | Smith | 423/574 |
| 4,011,822 | 3/1977 | Choi | 110/190 |
| 4,153,674 | 5/1979 | Verloop et al. | 423/573 R |
| 4,279,882 | 7/1981 | Beavon | 423/574 R |
| 4,487,754 | 12/1984 | Reed | 423/576 |

OTHER PUBLICATIONS

"Fundamentals of Sulfur Recovered by the Claus Process", by B. Gene Goar, 1977.
"Oxygen Use in Claus Sulfur Plants", by M. R. Gray, and W. Y. Svrcek, 1981 Gas Conditioning Conference Report.
"Claus Plant Oxygen Enrichment", 1983 publication by Linde of Union Carbide.

Primary Examiner—John Doll
Assistant Examiner—Jeffrey Edwin Russel
Attorney, Agent, or Firm—Geoffrey L. Chase; James C. Simmons; William F. Marsh

[57] ABSTRACT

A process and system are set forth for improving an oxygen-enriched Claus plant by introducing a water stream into the reaction furnace to moderate oxygen-induced high temperatures which allow oxygen-enrichment and attendant throughput in the Claus plant to higher levels than heretobefore practiced.

7 Claims, 1 Drawing Sheet

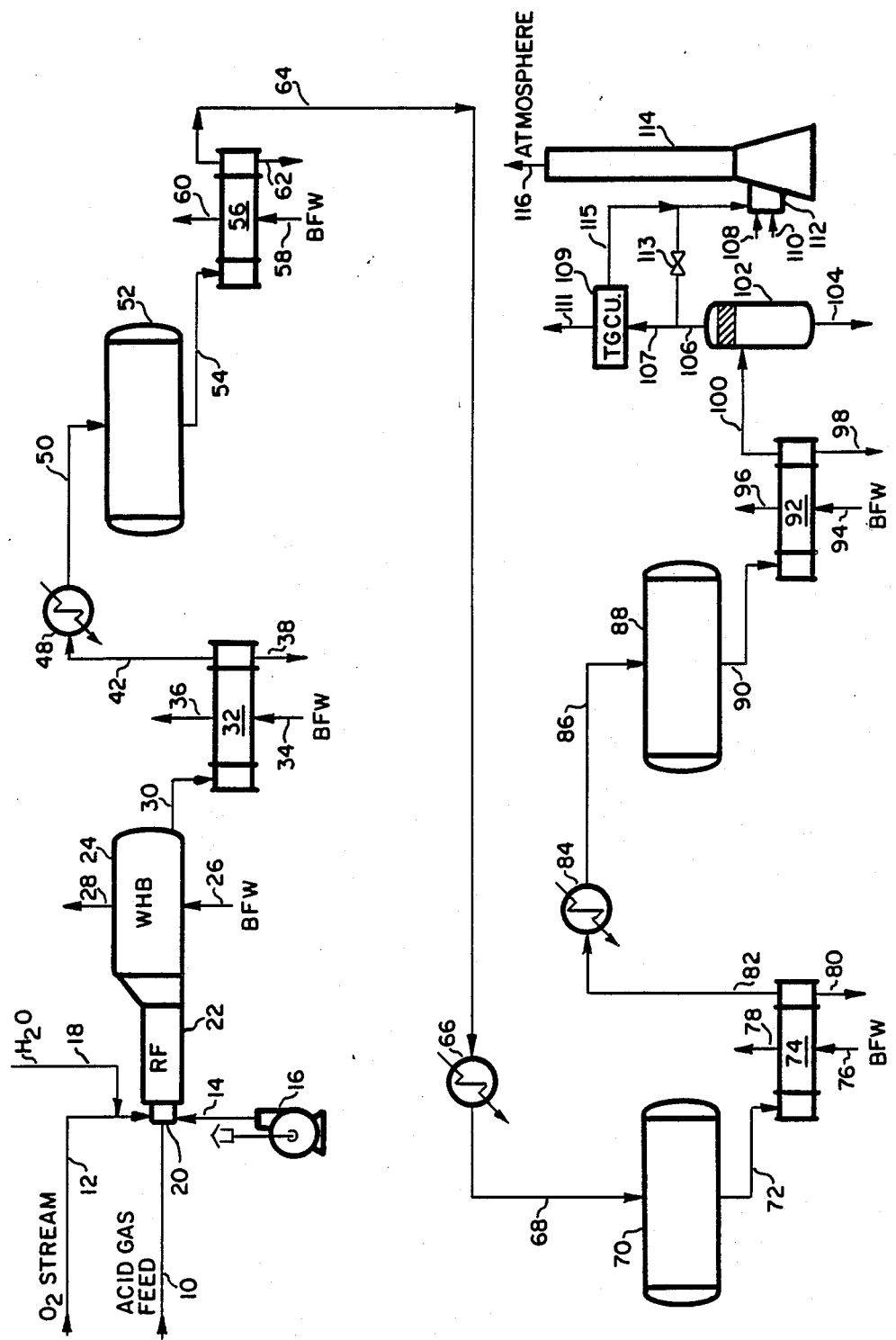

TEMPERATURE MODERATION WITH WATER OF AN OXYGEN ENRICHED CLAUS SULFUR PLANT

TECHNICAL FIELD

The present invention is directed to the recovery of sulfur from hydrogen sulfide-containing gas streams. Specifically, the present invention is directed to an improved mode of temperature moderation in a Claus sulfur plant using oxygen-enrichment to increase its capacity.

BACKGROUND OF THE PRIOR ART

It is known in the prior art to recover elemental sulfur from hydrogen sulfide-containing gas streams as is set forth in the article "Fundamentals of Sulfur Recovered by the Claus Process" by B. Gene Goar, published in the 1977 Gas Conditioning Conference Report.

It is also known to use oxygen-enrichment in the operation of a Claus sulfur plant to increase the capacity of hydrogen sulfide treated in a plant as set forth in the article "Oxygen Use in Claus Sulfur Plants" by M. R. Gray and W. Y. Svrcek, published in the 1981 Gas Conditioning Conference Report. In that article it was disclosed that oxygen can be added to the air feed to the burner of the reaction furnace in a Claus sulfur plant to increase the amount of hydrogen sulfide which is combusted to sulfur dioxide for later catalytic conversion to elemental liquid sulfur product. The article recites that the maximum capacity increase which can be achieved with oxygen enrichment is determined by the pressure drop through the plant, the reactor space velocity and temperatures of the reaction furnace and the various catalytic zones, particularly the refractory materials used in the furnace superstructures of the Claus plant.

In the 1983 publication by Linde of Union Carbide entitled "Claus Plant Oxygen Enrichment", it is noted that oxygen-enrichment limitations exist for rich hydrogen sulfide streams due to temperature limits in the furnace or waste heat boiler of the Claus plant.

U.S. Pat. No. 3,822,341 discloses a Claus plant which uses oxygen-enrichment. One source of the oxygen is initially used to strip residual $SO_2$ from a sidestream in vessel 92, before the oxygen stream in line 96 is optionally recycled to be included with the oxygen in line 12 going to the combustion zone of the waste heat boiler 8, as recited at column 5, lines 65-68 of the specification. Because the oxygen content of such a stream is completely consumed in an exothermic reaction, this stream cannot be utilized as a moderating medium for flame temperature of the reaction furnace. As described by the Goar article above, Claus sulfur plants typically have an adiabatic reaction furnace followed by waste heat boiler. The excessive temperature problem with oxygen enriched operation occurs in the adiabatic reaction furnace. U.S. Pat. No. 3,822,341 ignores the existence of this problem.

U.S. Pat. No. 4,153,674 discloses a Claus plant and tailgas clean up plant wherein a gas stream in line 20 is removed from a tailgas system and is returned or recycled to the front end of the Claus plant 7. This patent does not consider oxygen-enrichment or flame temperature moderation by a recycle stream. Also, the tailgas is reacted to convert all sulfur to hydrogen sulfide, which is adsorbed, stripped and returned to the Claus plant.

U.S. Pat. No. 4,279,882 discloses a sulfur recovery process, which uses only a series of catalytic reaction beds rather than a combustion reaction furnace, as in the traditional Claus plant. A temperature modifying recycle stream is set forth in the patent, wherein stream 26 is returned to the feed in order to control the temperature in the catalytic reaction zones. This process is economical only for dilute hydrogen sulfide feed gas applications. It also requires a recycle blower operating at high temperature.

The present invention overcomes the shortcomings of the prior art by increasing throughput of a Claus plant with an oxygen-enrichment to an extent beyond that contemplated in the prior art due to flame temperature limitations. This is achieved by injecting water into the reaction furnace of the Claus plant in order to moderate the flame temperatures. This water injection moderates any increases in pressure drop, which would be caused by recycling inerts from a particular downstream portion of the process. It also avoids the need for a recycle blower.

BRIEF SUMMARY OF THE INVENTION

The present invention is directed to a process for recovering sulfur from a feed gas stream rich in hydrogen sulfide, wherein the gas stream is partially combusted with an oxygen-enriched gas in a Claus reaction furnace, the combustion effluent is cooled with the attendant condensation and separation of sulfur in a first condensation zone and the remaining effluent stream is typically passed through at least one stage of reheating, conversion in a catalytic Claus reaction zone and cooling with attendant condensation and separation of sulfur in an additional condensation, wherein the improvement comprises introducing water into the reaction furnace zone to moderate the temperature of the reaction furnace zone.

Typically the process uses three stages of reheating, conversion and cooling and separation subsequent to the first condensation zone.

The process is relevant for hydrogen sulfide containing streams wherein the sulfide is in the range of 60-100 mole %. Preferably, the hydrogen sulfide content of the feed gas is 80-100 mole %.

Preferably the oxygen enrichment of the reaction furnace is in the range of 32-100 mole %. More preferably the enrichment is 40-75 mole %.

The water injection flow rates can be in the range of up to 2.4 moles of water per moles of enriching oxygen fed to the burner of the reaction furnace. Preferably the water flow rate is up to 1.68 moles of water per mole of enriching oxygen.

Preferably the temperature of the reaction furnace zone is maintained in the range of 2400° to 2800° F.

The invention also is directed to a system for recovering sulfur from a feed gas stream rich in hydrogen sulfide by the Claus reaction, including: a reaction furnace for partially combusting a feed gas stream with an oxygen-rich gas, and typically a first condensing means for cooling and condensing sulfur from the combustion effluent, at least one train comprising a reheating means, a catalytic Claus reactor and an additional condensing means, for rewarming, further reacting and recovering sulfur from said effluent, wherein the improvement comprises means for injecting water into the reaction furnace of the Claus plant system to reduce the temperature of said reaction furnace.

Preferably, the means for introducing water into the reaction furnace comprises a conduit and orifice which disperses the water into the oxygen inlet to the reaction furnace. Optimally, the dispersion should be performed as an atomization of water into the oxygen stream.

BRIEF DESCRIPTION OF THE DRAWING

The drawing is a schematic representation of the oxygen-enrichment and water injection embodiment of a Claus plant.

DETAILED DESCRIPTION OF THE INVENTION

Claus sulfur recovery systems are widely utilized to recover sulfur from acid gas streams produced in natural gas purification and in petroleum refineries, primarily from amine sweetening. In refineries, the hydrogen sulfide is in the crude oil and is contained in hydrocarbon desulfurization unit off gases and fluidized catalytic cracker unit off gases. Often times, gas streams produced in the amine unit are quite rich in hydrogen sulfide, particularly in petroleum refineries, where it may be in the range of 80-95 mole % hydrogen sulfide. In many refineries, the Claus plant units are either fully loaded or subject to becoming fully loaded (capacity limited) due to the processing of heavy crude oils, which contain relatively large amounts of sulfur compounds. With the dwindling known reserves of refinable sweet hydrocarbons and crude oils, less attractive known sour oil reserves are now being processed, which less attractive oil reserves typically have high sulfur content. A trend in refining such high sulfur containing feeds will increase in the future. Therefore, a method for increasing the capacity of Claus plants to process sulfur, while maintaining the temperature limitations of the materials of the Claus plant is needed.

As Claus sulfur recovery unit feed rates are increased above capacity, several problems develop. At increased flow, the pressure dropped through the Claus plant and tailgas cleanup unit increases, and the back pressure increases require hydrogen sulfide and air feed inlet pressures beyond what is available from the equipment that supplies the hydrogen sulfide feed and the air blower that provides feed air. The increased flow also increases the space velocity in the reaction furnace and the catalytic reactor stages. This increase in space velocity, reduces sulfur conversion and increases emissions to the tailgas clean up unit. The increase flow to the tailgas clean up unit increases its pressure drop and further lowers tailgas sulfur recover to give increased and usually unacceptable sulfur emissions from the overall systems. The increased back pressures made in some Claus plants pose the risk of blowing the liquid sulfur drain seals which would release noxious, toxic hydrogen sulfide into the area of the plant. While booster blowers for the hydrogen sulfide and air feeds and higher pressure sulfur drain seals can provide some increase in capacity, the reduced sulfur conversion and increase sulfur emissions remain a problem.

One method which may be used to increase the capacity of an existing Claus plant is the use of oxygen to enrich the air stream to the reaction furnace of the plant from 21 mole % oxygen which is the content of air up to 70-90 mole % oxygen or higher, such as 100 mole % oxygen (wherein no air is introduced into the Claus plant). Any increase in oxygen content of the air stream effectively reduces the nitrogen content of gases passing through the Claus plant and increases its throughput capacity for sulfur by diminishing the gas flow of inerts, namely nitrogen which must also be passed through the equipment. Typically, the capacity of a Claus plant which is handling 80-90 mol% hydrogen sulfide with a typical concentration of hydrocarbons can be increased 10 to 15% by enriching the air with oxygen. Any further addition of oxygen will cause the flame temperature limitations of the firebrick and refractory in the reaction furnace to be exceeded.

If the acid gas stream contains 90 mole % hydrogen sulfide and the Claus plant is performing a typical burn of only one third of the hydrogen sulfide (one third of the fully stoichiometric air requirements) and the burner is receiving air (21 mole % oxygen), then the calculated theoretical adiabatic flame temperature should be about 2400° F. If the air stream is enriched with oxygen to 40 mole % oxygen, the calculated adiabatic theoretical flame temperatures should increase to about 3150° F. Again if the air stream is enriched with oxygen, by this time to 70 mole % oxygen, the calculated theoretical adiabatic flame temperature should increase to about 3750° F. However, most better quality fire brick and refractory material installed in Claus plant reaction furnaces are good for a maximum continuous operating temperature of only 2700° to 2800° F., if they have an alumina content of 85-90 wt% or greater. Therefore, it may be seen from the above calculations that only limited oxygen enrichment, 30-32 mole % oxygen of the air stream can be used and still hold the temperature below a maximum of 2800° F. With the small reduction of nitrogen input when increasing the air stream oxygen content from 21 up to 32 mole % oxygen, only a slight increase in Claus plant capacity is realized, approximately 12-15% capacity.

The present invention however permits increasing the oxygen-enrichment to above 32 mole % to increase capacity of an existing Claus sulfur recovery unit further by injecting water into the reaction furnace to moderate the oxygen-enriched flame temperatures. In practice, the injection rate of water would be set to provide dilution and cooling to control the reaction furnace temperature in the 2400° to 2800° F. With this technique, hydrogen sulfide feed and sulfur recovery capacity can be increased by 50-100% by enriching the air stream to 70 mole % oxygen when handling 90 mole % hydrogen sulfide acid gas feed. By injecting a liquid water stream under atomized or well dispersed conditions into the reaction furnace or preferably the oxygen inlet to the reaction furnace, the flame temperatures associated with very high oxygen-enrichment necessary to effect significant throughput increases are moderated by the relatively cool and inert injected water. Additionally, the water has a very high heat sink capacity. Although, liquid water is preferred in order to take advantage of its heat of vaporization, it is contemplated that steam may be used with a less dramatic temperature moderating effect. It should be understood that the use of the term water herein shall include steam.

Optimally, the water injection is made in the oxygen inlet to the burner 20. It is contemplated that the water can be added in a jacketed oxygen lance wherein the water cools the lance apparatus to avoid combustion of the same by the rich oxygen atmosphere.

Alternately, the water injection could be made in the hydrogen sulfide feed to the reaction furnace, the air feed to the reaction furnace or an independent feed to the reaction furnace. The combination of oxygen-enrichment and water injection provides an unexpected potential enhancement of capacity or throughput for a Claus plant. Such a process configuration can be provided as a retrofit to a capacity limited existing Claus plant system or could be provided in a smaller size new installation taking into account the increased capacity freedom provided by the oxygen-enrichment and water injection attributes.

At first glance, it may appear that the increased flow from the introduction of water into the process will increase the Claus plant system pressure drop and reintroduce the pressure drop limitation which oxygen-enrichment alleviated. This is not correct, as is apparent from a comparison of the deleted nitrogen in contrast to the added water. For the case of pure oxygen with a 92.4% hydrogen sulfide feed, every mole of nitrogen removed from the system by the use of oxygen-enrichment, only 0.44 moles of liquid water are necessary to alleviate the flame temperature increases above the maximum allowable flame temperature. Further, by introducing water into the system in the form of a dispersion or atomization of liquid water, rather than as steam, the heat capacity of the water is increased by the heat absorbed as the water changes from its liquid state to its vapor state. This provides an unexpected freedom for moderating temperature without increasing pressure drop through the system as one would expect to have occurred by the addition of an additional ingredient into the process, i.e. adding water as a moderant.

In examining the Claus process, the combustion of hydrogen sulfide by $$H_2S + \tfrac{3}{2} O_2 \longrightarrow H_2O + SO_2$$

is irreversible. All of the oxygen is reacted. The reaction $$2H_2S + SO_2 \rightleftharpoons 2H_2O + 3S_1$$

is reversible. Increasing the water and is partial pressure will tend to reverse this reaction. It therefore appears that water injection would greatly decrease equilibrium conversion. But this is not so. Water injection greatly decreases the nitrogen partial pressure. This, in turn, increases the hydrogen sulfide and sulfur dioxide partial pressure, which drives the reaction to the right. The net effect is that there is little or no direction in sulfur conversion.

This is demonstrated in the table set forth below.

Going from a Case 1 bottlenecked air operation and a Case 2 oxygen enriched operation at 32 mole % oxygen enrichment to Case 3 and 4 oxygen-enrichment with water moderation that a substantial increase in sulfur processing capacity is achieved without any significant loss in sulfur recovery wt%. This capacity increase is equal to or greater than any other known arrangement for accomplishing a Claus plant capacity increase.

stream is introduced into the Claus system in line 10 having a hydrogen sulfide content of 92.4 mole %. The feed is at a temperature of 100° F. and a pressure of 25 psia. The acid gas stream is introduced into a burner 20 of the reaction furnace 22 to be combusted with, potentially, air in line 14 which is pressurized through compressor 16, as well as oxygen in line 12, also introduced into the burner for the downstream combustion reaction. The oxygen can be of any desired purity although preferably commercially pure oxygen is introduced into the system. It is understood that depending upon the total oxygen-enrichment required it may be chosen to delete some or all of the air introduced into the burner 20. In order to moderate the temperature of the oxygen-enriched combustion of the acid gas feed, water is introduced in line 18 into the burner 20 and, most preferably, the water is introduced into the oxygen stream 12 prior to the burner. However, it is contemplated that the water addition could be directly into the burner or alternately into the air feed or acid gas feed to the burner.

Preferably, the water/oxygen mixture is introduced into the air feed (if used) prior to the burner. Preferably, the water is dispersed in an atomized manner. The amount of water added is in the range of up to 2.4 moles per moles of enriching oxygen fed to the system. Preferably the range of water addition is up to 1.68 moles of water per mole of enriching oxygen. In order to atomize the water it is usually necessary to send a pressurized water stream through a small orifice and in dealing with a small orifice it will be preferable to use demineralized water. Although the source of the water may be a fresh water supply, it is also contemplated that recycle water from the water of reaction from the downstream process system could be treated and recycled for introduction at the burner 20 of the reaction furnace 22. The reactants are combusted in burner 20 and evolved into the reaction furnace 22 where the reactions of the Claus process occur. Specifically in the burner, hydrogen sulfide and oxygen combine to produce sulfur dioxide and water, wherein $\tfrac{1}{3}$ of the reaction feed is initially combusted and the remaining $\tfrac{2}{3}$ react with the sulfur dioxide produced to result in sulfur and water according to the following formulaes:

$$H_2S + 3/2\ O_2 \rightarrow SO_2 + H_2O$$

$$2H_2S + SO_2 \rightarrow 3/2\ S_2 + 2H_2O$$

Some hydrogen is also produced by hydrogen sulfide disassociation, as follows:

$$2H_2S \rightarrow 2H_2 + S_2$$

The reactor furnace effluent then passes through a circuitous heat exchange zone or waste heat boiler 24

| CASE | DESCRIPTION | MOL % $O_2$ | RELATIVE SULFUR PROCESSING CAPACITY | SULFUR RECOVERY WT % |
|---|---|---|---|---|
| 1 | Air Only | 21 | 1.00 | 97.7 |
| 2 | $O_2$ Enriched Air | 32 | 1.15 | 98.0 |
| 3 | $O_2$ Enriched Air Water Injection | 70 | 1.75 | 97.0 |
| 4 | Oxygen Water Injection | 100 | 1.85 | 97.0 |

The present invention will now be described in greater detail with reference to a preferred embodiment which is illustrated in the FIGURE. An acid gas feed wherein the combustion effluents are cooled against boiler feed water in line 26, which then produces steam in line 28. In the waste heat boiler 24 the reaction effluents are converted from one form of sulfur species to another ranging from $S_3$ to $S_8$. The major sulfur species are formed according to the following equations:

$$S_2 \rightarrow \tfrac{1}{3}S_6$$

$$S_2 \rightarrow \tfrac{1}{4}S_8$$

The cooled effluent from the waste heat boiler in line 30 is still at high temperature and at a pressure only slightly below the pressure of the feeds to the burner. The effluent is then introduced into the first condenser 32, wherein the effluent is again heat exchanged to cool the effluent against boiler feed water in line 34 which produces steam in line 36. Liquid sulfur is condensed out in line 38 and the gaseous combustion effluent stream is removed in line 42.

The effluent stream in line 42 is then reheated in a reheater heat exchanger 48 against process steam. The reheated stream now in line 50 has been reheated to a temperature sufficient for further reaction of the sulfur contained therein. This stream is then introduced into a catalytic converter reactor 52 wherein additional quantities of hydrogen sulfide and sulfur dioxide are reacted to produce sulfur (primarily $S_6$ and $S_8$) and water according to the following equations:

$$2H_2S + SO_2 \rightarrow 3/6 S_6 + 2H_2O$$

$$2H_2S + SO_2 \rightarrow \tfrac{1}{4}S_8 + 2H_2O$$

The reacted stream now in line 54 is introduced into a second condenser 56 which again cools the effluent stream against boiler feed water in line 58 to produce additional steam in line 60. Additional elemental sulfur is recovered in line 62 wherein the sulfur species produced in the catalytic reaction are converted to high molecular weight sulfur species and are then condensed to elemental sulfur (primarily from $S_6$ and $S_8$) according to the following reactions:

$$S_6 \rightarrow 6S_1$$

$$S_8 \rightarrow 8S_1$$

The stream in line 64 is at a reduced temperature, which is below that desired for additional catalytic reaction. Therefore, the stream is introduced into reheater heat exchanger 66 and heated against processs steam to produce a feed stream in line 68 at a temperature sufficient for catalytic Claus reaction. This stream is introduced into a second catalytic converter 70 wherein a similar catalytic reaction between hydrogen sulfide and sulfur dioxide occurs with the catalytic effluent in line 72 going to yet another condenser 74, which is cooled with boiler feed water 76 to produce steam in line 78. An additional quantity of liquid elemental sulfur is removed in line 80.

The effluent stream in line 82 is further reheated in reheater heat exchanger 84 against process steam to produce a stream in line 86 at high temperatures sufficient for a catalytic Claus reaction. This stream is introduced into the third and final catalytic reactor 88 to react substantially the remaining hydrogen sulfide and sulfur dioxide to produce sulfur species which are removed in line 90. That stream is introduced into a condenser 92 and cooled by boiler feed water in line 94 producing steam in line 96. Further elemental sulfur in liquid form is removed in line 98, while a final effluent is recovered in line 100 comprising predominantly steam, nitrogen, carbon dioxide, hydrogen and residual hydrogen sulfide and sulfur compounds.

The stream in line 100 is introduced into a tailgas coalescer 102 wherein additional sulfur is removed in line 104. The residual stream in line 106 can be sent to a tailgas clean up unit 109 through line 107 or sent directly to an incinerator 114 by opening of valve 113. If the stream in line 106 is directed into the tailgas clean up unit 109 it can be further processed for the removal of sulfur and the resulting effluent in line 111 can be recycled to the front end of the system to the acid gas feed in line 10. The cleaned up inert gas stream can then be cycled through line 115 into an incinerator for venting to the atmosphere. The incinerator 114 is operated with a burner 112 supplied with air 108 and fuel such as natural gas in line 110 to combust any residual amounts of sulfur from the tailgas unit or alternately from the coalescer 102. The resulting stream in line 116 should be environmentally acceptable and can be vented to atmosphere.

The present invention as described above is exemplary of only one embodiment of the invention which incorporates oxygen-enrichment with a moderating water injection stream to provide: (a) an unlimited degree of freedom in oxygen-enrichment levels, (b) an increase in throughput of a Claus plant to very high levels, (c) a decrease in overall pressure drop through the Claus plant system, (d) reduction effluent flow to and through the tailgas process unit, (e) an equivalent or heightened percent recovery of sulfur from the feed gas stream, (f) a negligible effect by water addition on the Claus reaction equilibrium, (g) an improved and easier separation of the inerts from the sulfur to the tailgas clean up unit wherein the water being the predominant inert is easily phase separated from the residual gas stream, and (h) increased residence time in the reaction furnace over that wherein other inerts moderating streams are utilized or nitrogen from air is present, due to the decreased volume of gases passing through the reaction furnace with water injection which results from the superior heat capacity of liquid water as a moderant and the absence of any large quantities of nitrogen, which results from the use of oxygen-enrichment.

The present invention has been described with regard to one preferred embodiment, but those skilled in the art will be capable of contemplating other variants which are deemed to be within the scope of the invention, which scope should be ascertained from the claims which follow.

I claim:

1. In a process for recovering sulfur from a feed gas stream containing 60-100 mole% hydrogen sulfide wherein the gas stream is partially combusted with oxygen-enriched air in a Claus reaction furnace zone, a combustion effluent is cooled with the attendant condensation separation of sulfur in a condensation zone and the remaining effluent stream is further treated, the improvement comprising oxygen enriching the combustion in the range of 32-100 mole% oxygen and introducing a moderating stream of added liquid water into the reaction furnace zone in order to moderate the temperature of the reaction furnace zone in the range of 2400° to 2800° F.

2. In a process for recovering sulfur from a feed gas stream containing 60-100 mole% hydrogen sulfide wherein the gas stream is partially combusted with oxygen-enriched air in a Claus reaction furnace zone, a combustion effluent is cooled with the attendant condensation separation of sulfur in a first condensation zone and the remaining effluent stream is passed through at least one stage of reheating, conversion in a catalytic Claus reaction zone and cooling with attendant condensation and separation of sulfur in an additional condensation zone, the improvement comprising oxygen enriching the combustion in the range of 32-100 mole% oxygen and introducing a moderating stream of added liquid water into the reaction furnace zone in order to moderate the temperature of the reaction furnace zone in the range of 2400° to 2800° F.

3. The process of claim 2 wherein three stages are used to process the remaining effluent stream.

4. The process of claim 1 wherein the feed gas stream has a hydrogen sulfide content of 80-100 mole%.

5. The process of claim 1 wherein the introduced water stream flow rates constitutes up to 2.4 moles of water per mole of enriching oxygen.

6. The process of claim 1 wherein the introduced water stream is in the range of up to 1.68 moles per moles of enriching oxygen.

7. The process of claim 1 wherein the introduced water stream is atomized into the oxygen feed to the reaction furnace.

* * * * *